Dec. 21, 1948.                    R. L. LONGINI                    2,456,968
                    PROCESS FOR OUTGASSING PHOTOCELLS
                              CONTAINING ANTIMONY
                              Filed Dec. 18, 1947
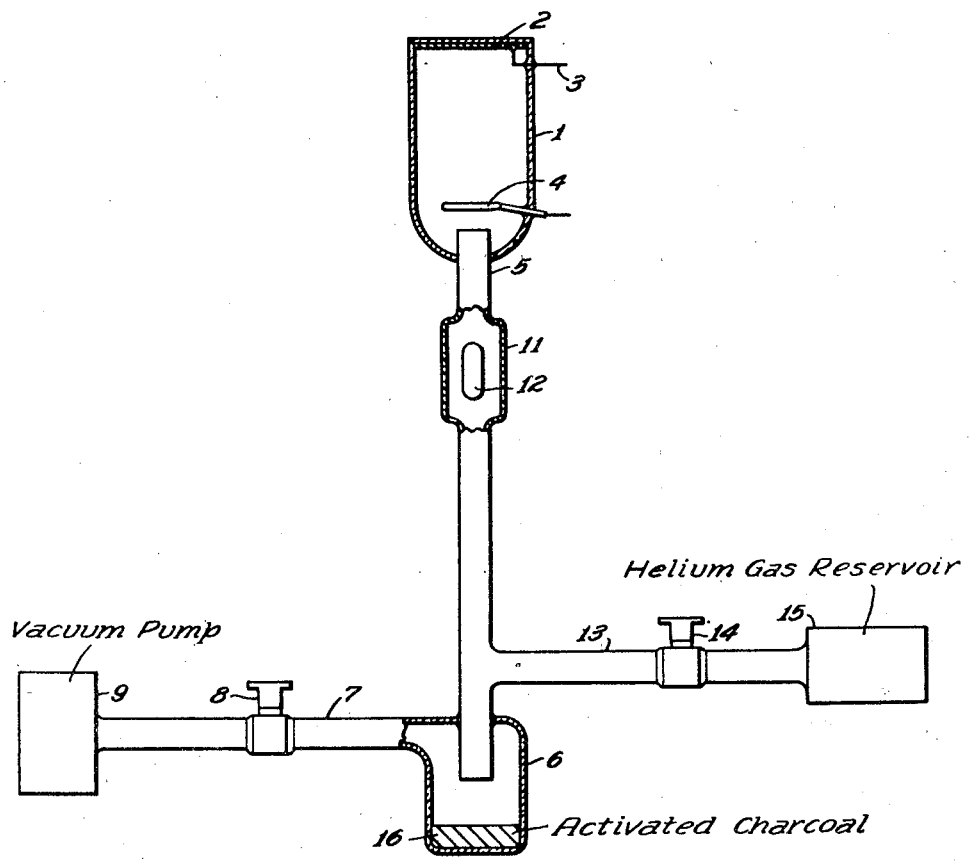
WITNESSES:
INVENTOR
Richard L. Longini.
BY
ATTORNEY Patented Dec. 21, 1948

2,456,968

UNITED STATES PATENT OFFICE 2,456,968

PROCESS FOR OUTGASSING PHOTOCELLS CONTAINING ANTIMONY

Richard L. Longini, Forest Hills, Pa., assignor to Westinghouse Electric Corporation, East Pittsburgh, Pa., a corporation of Pennsylvania Application December 18, 1947, Serial No. 792,545

18 Claims. (Cl. 316—24)

1

My invention relates to a system for minimizing the evaporation from surfaces operated at a high temperature in a high vacuum, and relates in particular to a system for minimizing the evaporation from antimony surfaces which are being outgassed at elevated temperature during the evacuation of electrical discharge tubes.

For certain purposes such as the construction of photoelectric cells, it is desirable to operate materials such as antimony at a temperature of several hundred degrees centigrade while positioned in a high evacuated chamber in order to free the walls of the chamber itself from occluded and absorbed substances of which water vapor is usually one. Thus in the art of manufacturing ultra-high vacuum electrical discharge devices comprising glass, or even metal, containers, it is a frequent practice to heat the container to a temperature of several hundred degrees for a prolonged period during the process of evacuating the container by means of a vacuum-pumping system. If this practice is not resorted to, water and other substances which are present on the interior of the walls will gradually evaporate into the container if it is sealed off from the pump system, running the vacuum and interfering with the normal and desired operation of structural elements within the container for a long period of time after it has been sealed off from the pumping system. Such a process is known in the art as "outgassing." The rate at which this outgassing goes up rapidly with the temperature of the container walls at the time the operation is in progress, so it is usually desirable to keep the container walls as hot as is possible without their softening or undergoing deterioration.

However, it is often desirable to position within high vacuum containers surfaces of metals having an appreciable vapor pressure at the temperatures at which it is thus desirable to outgas the container walls, and particularly when these surfaces are employed in the form of very thin films, there is danger that so large a quantity of the desired material will be evaporated during the outgassing process as to destroy the effectiveness of the device for subsequent use. One illustration of this difficulty has been found where it has been desired to employ surfaces of antimony as cathodes of photoelectric cells which are to be operated at ultra-high vacuum, say of the order of $10^{-7}$ mm. of mercury. Antimony surfaces of this type are frequently further activated by the introduction of cesium into the tube. For the purpose of exhausting such tubes to the desired pressure, it is advantageous to be able to bake out

2 the tube undergoing the evacuation at a temperature of the order of 350° C. It is found, however, that at this temperature the evaporation of the antimony into the vacuum is so great as to cause difficulty both because of the actual disappearance of the antimony from the surface originally deposited and because of its recondensation of the antimony on other parts of the tube where its presence is undesirable.

One object of my invention is accordingly to provide an improved system for producing high vacuum tubes containing materials which vaporize in substantial amounts at temperatures at which it is desired to operate the devices at one time or another.

Another object of my invention is to provide a system for outgassing high vacuum containers.

Another object of my invention is to provide an improved system for evacuating high vacuum devices containing metals which vaporize at a non-negligible rate at the temperature at which the outgassing operation is conducted.

Still another object of my invention is to provide an improved procedure for outgassing high vacuum devices containing antimony surfaces.

Yet another object of my invention is to produce a novel type of photoelectric cell containing a surface of antimony.

Other objects of my invention will become apparent from reading the following description taken in conjunction with the accompanying drawing in which the single figure is a diagrammatic view of a photoelectric cell containing an antimony surface in the process of being outgassed in accordance with the principles of my invention.

Referring in detail to the drawing, a high vacuum container 1 which may, for example, be of glass has a surface 2 comprising a deposit of antimony, provided with an inleading wire 3 sealed through the walls of the container 1. The container 1 is also provided with a second electrode 4 likewise sealed through its walls. A container 1 is provided with an inlet tube 5 for attachment to a vacuum system comprising a trap 6 and a duct 7 embodying a valve 8 which leads to a high vacuum pump 9. The inlet tube 5 is connected to an enlargement 11 in the duct system in which is supported by any suitable means (not shown) a metal pellet 12 containing a mixture such as silicon and cesium dichromate which is suitable for generating cesium. Between the enlargement 11 and the trap 6 is connected a second duct 13 embodying a valve 14 and leading to a reservoir 15 of helium gas. The trap 6 is filled to a suitable depth in a manner well known in the art with activated charcoal 16, and is adapted to be either heated for outgassing or immersed in liquid nitrogen, or other low temperature cooling means familiar to the high vacuum art.

In order to exhaust the container 1 in accordance with my preferred system, the valve 14 is closed and the valve 8 is opened, and the entire system pumped to a high vacuum. The container 1, the tube 5, enlargement 11, trap 6 and ducts 7 and 13 are then baked out in a suitable oven (not shown), a type well known in the vacuum tube art to a temperature of about 200° C. The trap 6 may be independently heated to much higher temperature. At this time the activated charcoal 16 is thoroughly outgassed. This procedure removes a major part of the gases from the walls of the vacuum chamber. When the evolution of the gases appears to be nearly complete, the cesium generating pellet 12 is heated to about 700° C., by subjecting it to a high frequency induction, a procedure now well known for outgassing metals in the vacuum tube art. When the cesium 12 has been entirely outgassed, the valve 8 is closed and the valve 14 is opened to admit helium to the vacuum system. While it is possible to carry out my process rather effectively at helium pressures of 0.01 atmosphere or even below, it is for many purposes found preferable to have the helium pressure around 0.1 atmosphere. Container 1 and enlargement 11 are then raised in temperature to about 350° C. At this time trap 6 may be cooled with liquid nitrogen. I have found that, while helium is likewise absorbed by the activated charcoal 16, its absorption is at only a small rate compared with the rate at which the charcoal absorbs water vapors and other gases likely to be present in the walls of high vacuum containers.

I have likewise found that the presence of helium about the surface of the antimony 2 cuts down, in a way that may seem surprising, the ratio of antimony evaporation to the evaporation of water vapor and other undesired gases from the antimony surface. I have, in fact, found that at helium pressure of 0.01 atmosphere, the presence of the helium seems to cause no substantial decrease in the rate at which water vapor and the other undesired substances leave the antimony surface, but that the rate of antimony evaporation is less than 3% of its evaporation rate in vacuum. While increasing the helium pressure from 0.01 atmosphere to 0.1 atmosphere decreases the rate of disappearance of water vapor and other deleterious substances by an appreciable figure, the rate of antimony evaporation is decreased by even a greater factor. Since the presence of helium at a given temperature decreases the rate of antimony evaporation very materially, it is possible in practice to bake out the tubes at a higher temperature in helium than can be done in vacuum evacuation with the same rate of antimony evaporation. I have, accordingly, made comparisons of the relative quantity of outgassing found possible by operation respectively in helium and in vacuum with a given rate of antimony evaporation, and have found the outgassing in antimony to be around 100 times as rapid in helium at 0.1 atmosphere pressure as in vacuum.

While I have described helium as the preferred gas to be employed during the outgassing process, other gases which will produce no chemical combination or other deleterious effect on the materials within the container 1 may similarly be employed. However, for most purposes, the helium has been found to be many times less subject to absorption, and much more capable of increasing the rapidity of degassing, than such other gases as argon or nitrogen. Hydrogen may be preferred in many cases where it does not react chemically as it does with the antimony herein described.

During the above-described outgassing process the exhaust pump is shut off from the system. During this period the activated charcoal trap 6 acts as the pump for the outgassing components. It is important that whatever atmosphere is used in the system does not interfere with the action of the charcoal as a pump for the gases liberated during outgassing. Numerous substances known in the art by the term "getter" may perform the function of the charcoal herein described.

After sufficient time has elapsed, the temperature of container 1 and enlargement 11 are lowered to about 200° C. after which valve 8 is opened and the whole system is pumped to a high vacuum. I have found that 200° C. is sufficiently high to remove all helium that may have adhered to surfaces of the system.

In general for outgassing vacuum-chamber surfaces the counterpart of the helium described above, as used with an antimony surface, should be one which does not poison the "getter" used by decreasing its ability to absorb a gas or vapor which it is desired to remove from the tube; it should be a gas readily removed from the chamber after completion of the high-temperature cycle; and should be a gas which will have no substantial injurious effect on the chamber contents.

To illustrate another application of my invention, the evaporation of copper from targets or other electrodes of X-ray tubes during the outgassing-treatment to which it is desirable that such tubes be submitted may be minimized by subjecting such tubes to the action of helium in the manner described above as applied to antimony photocells. Neon, argon or hydrogen might also be substituted for the helium for this purpose.

I claim as my invention:

1. The process of outgassing a high vacuum container which comprises exhausting it to a high vacuum, filling the container with an atmosphere of helium, heating the container to a temperature sufficient to outgas it, exhausting any gases evolved from the walls of said container at said temperature by means of an absorption trap, and then removing said helium atmosphere.

2. The method of exhausting a high vacuum apparatus which comprises pumping the atmosphere out of said apparatus, heating and evacuating to low pressure a container for an efficient gas-absorbing material which is connected to said apparatus, filling said apparatus with an atmosphere of helium, heating said apparatus to a temperature sufficient to outgas it while cooling said material to a low temperature, and thereafter evacuating the helium from said apparatus.

3. The method of exhausting a high vacuum apparatus which comprises pumping the atmosphere out of said apparatus, heating and evacuating to low pressure a container for an efficient gas-absorbing material which is connected to said apparatus, filling said apparatus with an atmosphere of helium at a pressure of the order of 0.1 atmosphere, heating said apparatus to a temperature of several hundred degrees centigrade while cooling said gas-absorbing material to a low temperature, and thereafter evacuating the helium from said apparatus.

4. The process of outgassing a high vacuum container which comprises exhausting it to a high vacuum, filling the container with an atmosphere of helium at a pressure of the order of 0.1 atmosphere, heating the container to a temperature sufficient to outgas it, exhausting any gases evolved from the walls of said container at said temperature, and then removing said helium atmosphere.

5. The method of outgassing a high vacuum tube containing a surface of antimony which comprises first evacuating the atmosphere from said tube, evacuating and heating a container enclosing an efficient gas-absorbing material, filling said tube with helium, heating said tube to a temperature sufficient to outgas its interior, allowing said tube to stand in communication with said container while the latter is cooled to a low temperature, and thereafter evacuating said helium from said tube.

6. The method of outgassing a high vacuum tube containing a surface of antimony which comprises first evacuating the atmosphere from said tube, evacuating and heating a container enclosing an efficient gas-absorbing material, filling said tube with helium at a pressure of about 0.1 atmosphere, heating said tube to a temperature sufficient to outgas its interior, allowing said tube to stand in communication with said container while the latter is cooled to a low temperature, and thereafter evacuating said helium from said tube.

7. The method of outgassing a high vacuum tube containing a surface of antimony which comprises first evacuating the atmosphere from said tube, evacuating and heating a container enclosing activated charcoal, filling said tube with helium, heating said tube to a temperature sufficient to outgas its interior, allowing said tube to stand in communication with said container while the latter is cooled to a low temperature, and thereafter evacuating said helium from said tube.

8. The method of outgassing a high vacuum tube containing a surface of antimony which comprises first evacuating the atmosphere from said tube, evacuating and heating a container enclosing activated charcoal, filling said tube with helium at a pressure of about 0.1 atmosphere, heating said tube to a temperature sufficient to outgas its interior, allowing said tube to stand in communication with said container while the latter is cooled to a low temperature, and thereafter evacuating said helium from said tube.

9. The method of forming a photoelectric device which comprises fabricating a vacuum tight container with an antimony surface therein, evacuating the atmosphere from said container, heating and evacuating an enclosure for activated charcoal which is connected to said container, allowing helium to flow into said container and said enclosure, heating said container to a temperature sufficient to outgas it while cooling said enclosure to a low temperature, exhausting said helium from said enclosure, introducing cesium vapor into said enclosure and sealing it off vacuum tight.

10. The method of forming a photoelectric device which comprises fabricating a vacuum tight container with an antimony surface therein, evacuating the atmosphere from said container, heating and evacuating an enclosure for activated charcoal which is connected to said container, outgassing a quantity of cesium, allowing helium to flow into said container and said enclosure, heating said container to a temperature sufficient to outgas it while cooling said enclosure to a low temperature, exhausting said helium from said enclosure, introducing cesium vapor into said enclosure and sealing it off vacuum tight.

11. The method of forming a photoelectric device which comprises fabricating a vacuum tight container with an antimony surface therein, evacuating the atmosphere from said container, heating and evacuating an enclosure for activated charcoal which is connected to said container, outgassing a quantity of cesium generating material, allowing helium gas at a pressure of 0.1 atmosphere to flow into said container and said enclosure, heating said container to a temperature of several hundred degrees Centigrade while cooling said enclosure to a low temperature, exhausting said helium gas from said enclosure, introducing cesium vapor into said enclosure and sealing it off vacuum tight.

12. The process of outgassing a high vacuum container which comprises exhausting it to a high vacuum, filling the container with an atmosphere of inert gas, heating the container to a temperature sufficient to outgas it, exhausting any gases evolved from the walls of said container at said temperature by means of an absorption trap, and then removing said inert gas atmosphere.

13. The method of exhausting a high vacuum apparatus which comprises pumping the atmosphere out of said apparatus, heating and evacuating to low pressure a container for an efficient gas-absorbing material which is connected to said apparatus, filling said apparatus with an atmosphere of inert gas, heating said apparatus to a temperature sufficient to outgas it while cooling said material to a low temperature, and thereafter evacuating the inert gas from said apparatus.

14. The method of outgassing a high vacuum tube containing a surface of antimony which comprises first evacuating the atmosphere from said tube, evacuating and heating a container enclosing an efficient gas-absorbing material filling said tube with inert gas, heating said tube to a temperature sufficient to outgas its interior, allowing said tube to stand in communication with said container while the latter is cooled to a low temperature, and thereafter evacuating said inert gas from said tube.

15. The method of outgassing a high vacuum tube containing a surface of antimony which comprises first evacuating the atmosphere from said tube, evacuating and heating a container enclosing activated charcoal, filling said tube with inert gas, heating said tube to a temperature sufficient to outgas its interior, allowing said tube to stand in communication with said container while the latter is cooled to a low temperature, and thereafter evacuating said inert gas from said tube.

16. The method of outgassing a high vacuum tube containing a surface of antimony which comprises first evacuating the atmosphere from said tube, evacauting and heating a container enclosing activated charcoal, filling said tube with inert gas at a pressure of about 0.1 atmosphere, heating said tube to a temperature sufficient to outgas its interior, allowing said tube to stand in communication with said container while the latter is cooled to a low temperature, and thereafter evacuating said inert gas from said tube.

17. The method of forming a photoelectric device which comprises fabricating a vacuum tight container with an antimony surface therein, evacuating the atmosphere from said container, heating and evacuating an enclosure for activated charcoal which is connected to said container, allowing inert gas to flow into said container and said enclosure, heating said container to a temperature sufficient to outgas it while cooling said enclosure to a low temperature, exhausting said inert gas from said enclosure, introducing cesium vapor into said enclosure and sealing it off vacuum tight.

18. The method of forming a photoelectric device which comprises fabricating a vacuum tight container with an antimony surface therein, evacuating the atmosphere from said container, heating and evacuating an enclosure for activated charcoal which is connected to said container, outgassing a quantity of cesium, allowing inert gas to flow into said container and said enclosure, heating said container to a temperature sufficient to outgas it while cooling said enclosure to a low temperature, exhausting said inert gas from said enclosure, introducing cesium vapor into said enclosure and sealing it off vacuum tight.

RICHARD L. LONGINI.

REFERENCES CITED

The following references are of record in the file of this patent:

UNITED STATES PATENTS

| Number | Name | Date |
|---|---|---|
| 2,167,777 | Rentschler | Aug. 1, 1939 |